United States Patent
Wojatzki et al.

(10) Patent No.: US 8,939,423 B2
(45) Date of Patent: Jan. 27, 2015

(54) INTERNAL FULL MEMORY MODULE FOR SEAT TRACKS

(75) Inventors: Michael Wojatzki, Ennigerloh (DE); Hans-peter Mischer, Bad Meinberg (DE); Klaus Walter, Paderborn (DE); Marc Laumeier, Langenberg (DE); Andre Schebaum, Steinhagen (DE); Joerg Sternberg, Rheda-wiedenbru (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/123,864

(22) PCT Filed: Dec. 18, 2009

(86) PCT No.: PCT/US2009/068692
§ 371 (c)(1),
(2), (4) Date: Apr. 12, 2011

(87) PCT Pub. No.: WO2010/080593
PCT Pub. Date: Jul. 15, 2010

(65) Prior Publication Data
US 2011/0198906 A1    Aug. 18, 2011

Related U.S. Application Data

(60) Provisional application No. 61/139,000, filed on Dec. 19, 2008.

(51) Int. Cl.
*B60N 2/07*    (2006.01)

(52) U.S. Cl.
USPC ........... 248/429; 248/424; 248/430; 297/341; 297/344.1

(58) Field of Classification Search
USPC ........ 248/424, 429, 430; 297/341, 379, 344.1
See application file for complete search history.

(56) References Cited

U.S. PATENT DOCUMENTS

| | | | |
|---|---|---|---|
| 4,844,542 A * | 7/1989 | Humer | 297/341 |
| 5,660,440 A | 8/1997 | Pejathaya | |

(Continued)

FOREIGN PATENT DOCUMENTS

GB    2298785 A    9/1996

OTHER PUBLICATIONS

International Search Report for PCT/US2009/068692 dated Mar. 16, 2010.

(Continued)

*Primary Examiner* — Amy J. Sterling
(74) *Attorney, Agent, or Firm* — MacMillan, Sobanski & Todd, LLC (57) ABSTRACT

An adjustable memory track assembly for a vehicle seat has a lower rail (18) adapted to be secured relative to a vehicle frame, and an upper rail (20) adapted to support the seat for fore/aft sliding movement relative to the lower rail (18). The adjustable memory track assembly (24) also has a track lock assembly (24) operable via a first actuator (28) between a locked, engaged state wherein relative movement between the lower (18) and upper rails (20) is resisted, and an unlocked, disengaged state wherein the seat can be slid to and then locked in a user-selected position. The adjustable memory track assembly (24) is characterized in that the memory module (24) is provided with a blocking element to prevent rearward movement of the seat past the user-selected position independent of the locking state of the track lock assembly (24).

8 Claims, 4 Drawing Sheets

(56) References Cited

U.S. PATENT DOCUMENTS

| | | |
|---|---|---|
| 5,688,026 A | 11/1997 | Reubeuze et al. |
| 5,769,493 A | 6/1998 | Pejathaya |
| 5,873,629 A | 2/1999 | Schuler |
| 5,893,610 A * | 4/1999 | Schuler et al. ............ 297/341 |
| 6,170,790 B1 * | 1/2001 | Schuler et al. ............ 248/430 |
| 6,227,596 B1 | 5/2001 | Foucault et al. |
| 6,631,952 B1 | 10/2003 | Liebetrau et al. |
| 6,726,282 B2 | 4/2004 | Gray |
| 6,799,800 B2 | 10/2004 | Klahold et al. |
| 7,097,250 B2 | 8/2006 | Rausch et al. |
| 7,140,683 B2 | 11/2006 | Rausch et al. |
| 7,438,359 B2 | 10/2008 | Klahold et al. |
| 7,726,741 B2 * | 6/2010 | Klahold et al. ............ 297/341 |
| 2004/0164599 A1 | 8/2004 | Klahold et al. |
| 2006/0113829 A1 | 6/2006 | Klahold et al. |
| 2007/0236064 A1 | 10/2007 | Klahold et al. |
| 2009/0200849 A1 | 8/2009 | Schmale |

OTHER PUBLICATIONS

Second Office Action from the State Intellectual Property Office of the People's Republic of China dated Jul. 12, 2013.

* cited by examiner

INTERNAL FULL MEMORY MODULE FOR SEAT TRACKS

CROSS-REFERENCE TO RELATED APPLICATIONS

This application claims the benefit of U.S. Provisional Application No. 61/139,000, filed Dec. 19, 2008, the disclosure of which is incorporated herein by reference.

BACKGROUND OF THE INVENTION

This invention relates in general to adjustable seats and in particular to vehicle seats whose position may be adjusted fore and aft. Vehicles such as passenger cars typically include seats for the use of the driver and other occupants. In many vehicles, the position of the seats may be adjusted for the comfort of the occupant. The options to adjust the position of a seat typically include the ability to move the seat in a fore and aft direction by operation of a track assembly which mounts the seat to the vehicle floor.

Some vehicles include the option of moving the seats in the first row in order to facilitate access to the second row. This is known as an easy entry option and is commonly seen in two-door vehicles. The easy entry allows the generally upright back portion of the seat to be dumped, or pivoted from its normal use position to a more forward position, in order to facilitate access to the space behind the seat. Additionally, the track assembly may be actuated so that the seat may be moved forward. Often, the seat is moved to its most forward position. This allows a person to more easily gain access to the space located behind the seat. When the seat no longer has to be in the dumped position, the seat back may be raised to its use position, and the seat may be moved back from its most forward position. This allows an occupant to comfortably sit in the seat.

An occupant of a seat will typically position that seat in the location that is most comfortable for him or her. When the seat is dumped, it is moved from that selected position. It is desirable that when the seat is raised from the dumped position that it return to the desired position that the user had previously selected. This way the seat is in the location that is most comfortable for the occupant without the occupant having to adjust the seat again.

SUMMARY OF THE INVENTION

This invention relates to an adjustable memory track assembly for a vehicle seat. The track assembly has a lower rail adapted to be secured relative to a vehicle frame, and an upper rail adapted to support the seat for fore/aft sliding movement relative to the lower rail. The adjustable memory track assembly also has a track lock assembly operable via a first actuator between a locked, engaged state wherein relative movement between the lower and upper rails is resisted, and an unlocked, disengaged state wherein the seat can be slid to and then locked in a user-selected position. A memory module is operable via a second actuator to record the user-selected position. The second actuator is also operatively connected to disengage the track lock assembly to allow forward movement of the seat from the user-selected location to a forward location, and thereafter allow rearward movement of the seat back to, but not past, the user-selected location. The adjustable memory track assembly is characterized in that the memory module is provided with a blocking element to prevent rearward movement of the seat past the user-selected position independent of the locking state of the track lock assembly.

Various aspects of this invention will become apparent to those skilled in the art from the following detailed description of the preferred embodiment, when read in light of the accompanying drawings.

BRIEF DESCRIPTION OF THE DRAWINGS

FIG. 4 is a cross sectional view taken along line 4-4 of FIG. 3. FIG. 4 illustrates a track lock engaged and a memory module disengaged.

FIG. 5 is a cross sectional view similar to that shown in FIG. 4. FIG. 5 illustrates the track lock disengaged and the memory module engaged.

FIG. 6 is a cross sectional view similar to that shown in FIG. 5. FIG. 6 illustrates the track lock engaged and the memory module engaged.

FIG. 7 is a cross sectional view similar to that shown in FIG. 6. FIG. 7 illustrates a comfort adjustment bar being used, the track lock disengaged, and the memory module disengaged.

DETAILED DESCRIPTION OF THE PREFERRED EMBODIMENT

Figures 1, 2:
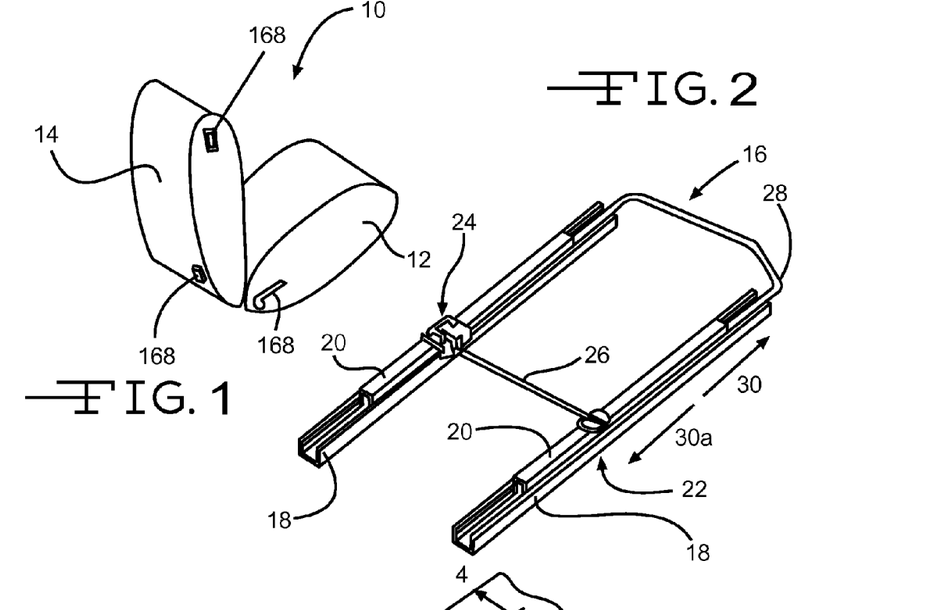
FIG. 1 is a rear perspective view of a bucket-type seat.
FIG. 2 is a perspective view of a seat track assembly of the seat of FIG. 1.

Referring now to the drawings, there is illustrated in FIG. 1 a perspective view of a bucket seat 10. The illustrated bucket seat 10 is a type commonly installed as the front row of seats in passenger vehicles. The bucket seat 10 includes a seat portion 12 and a backrest 14. The seat portion 12 and the backrest 14 are typically cushioned and upholstered for aesthetics and the comfort of seat occupants. The seat portion 12 and the backrest 14 may be upholstered with leather, fabric, or other desired materials. The bucket seat 10 is used for illustrative purposes only, and may be sized to accommodate any number of occupants or may be a bench-type seat.

Referring now to FIG. 2, there is shown a seat track assembly 16. The seat track assembly 16 includes a pair of first rails 18 and a pair of second rails 20. The first rails 18 are secured relative to a floor or a frame of a vehicle (not shown). The second rails 20 are mounted relative to the seat portion 12 of the bucket seat 10. The seat track assembly 16 includes a catch assembly, indicated generally at 22, mounted relative to one of the second rails 20. The seat track assembly also includes a catch and memory assembly, indicated generally at 24, mounted relative to the other of the second rails 20. The catch assembly 22 and the catch and memory assembly 24 are operatively connected by a connection tube 26. The catch assembly 22 and the catch and memory assembly 24 are also operatively connected by a comfort adjustment bar 28. The second rails 20 are able to move relative to the first rails 18 in the directions indicated by arrows 30 and 30*a*. This allows the bucket seat 10 to be moved fore-and-aft relative to the vehicle it is mounted in. The catch assembly 22 and the catch and memory assembly 24 are provided to lock the second rails 20 relative to the first rails 18. The comfort adjustment bar 28 is a first actuator used to manually operate the catch assembly 22 and the catch and memory assembly 24. The catch assembly 22 and the catch and memory assembly 24 will be described in detail below.

Figure 3:
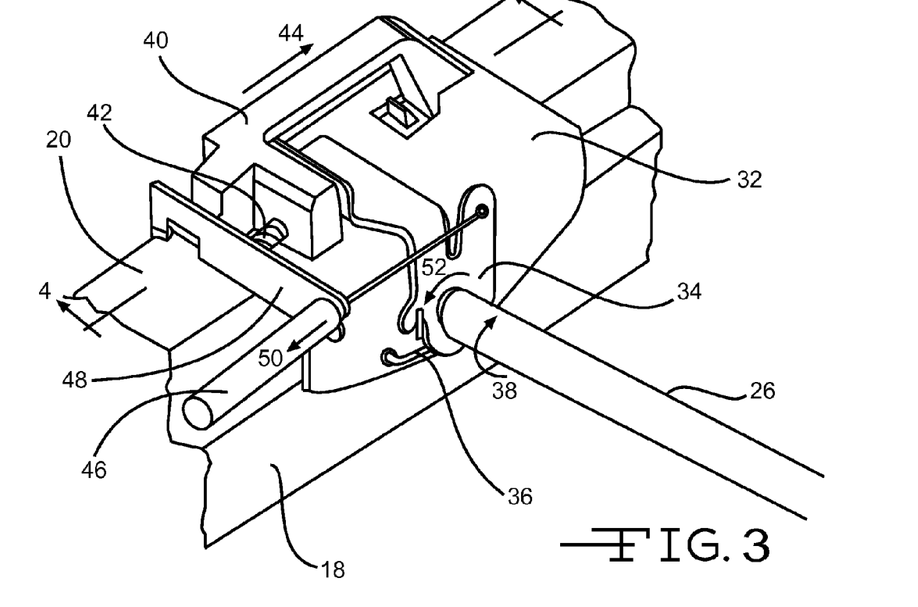
FIG. 3 is a perspective view of a portion of the seat track assembly of FIG. 2, showing a latch assembly and an easy entry assembly.

Referring now to FIG. 3, a detailed perspective view of the catch and memory assembly 24 is shown. The catch and memory assembly 24 includes a support bracket 32. The illustrated support bracket 32 is made of steel and is welded to the second rail 20; however, the support bracket 32 may be made of other desired materials, and may be attached to the second rail 20 by other desired fasteners, such as by pins, rivets, adhesives, or threaded fasteners. The connection tube 26 is mounted for pivotal movement relative to the support bracket 32. The catch and memory assembly 24 also includes an activation bracket 34. The activation bracket 34 is fixed relative to the connection tube 26. The activation bracket 34 may be fixed to the connection tube 26 by any desired fasteners, including welding, pins, rivets, adhesives, or threaded fasteners. The catch and memory assembly 24 includes a tube spring 36. The tube spring 36 is supported by the support bracket 32 and the activation bracket 34 and provides a force to bias the activation bracket 34 in the direction indicated by arrow 38. The catch and memory assembly 24 also includes a memory lock or memory sled 40. The memory sled 40 is mounted for sliding movement relative to the support bracket 32. The catch and memory assembly 24 includes a sled spring 42. The sled spring 42 applies a force to bias the memory sled 40 in the direction indicated by the arrow 44.

The catch and memory assembly 24 is operatively connected to the backrest 14 by a Bowden cable 46. The Bowden cable 46 is a second actuator used to operate the catch assembly 22 and the catch and memory assembly 24. The Bowden cable 46 is supported by the support bracket 32 by a support flange 48. When the backrest 14 is dumped, or pivoted from a generally upright use position to a more forward position adjacent the seat portion 10, the Bowden cable 46 applies a force in the direction indicated by the arrow 50. The force 50 applied by the Bowden cable 46 is sufficient to overcome the biasing force of the tube spring 36. Therefore, when the backrest 14 is dumped, the activation bracket 34 is rotated in an activation direction, indicated by arrow 52. The effects of this will be explained in reference to the following figures.

Figure 4:
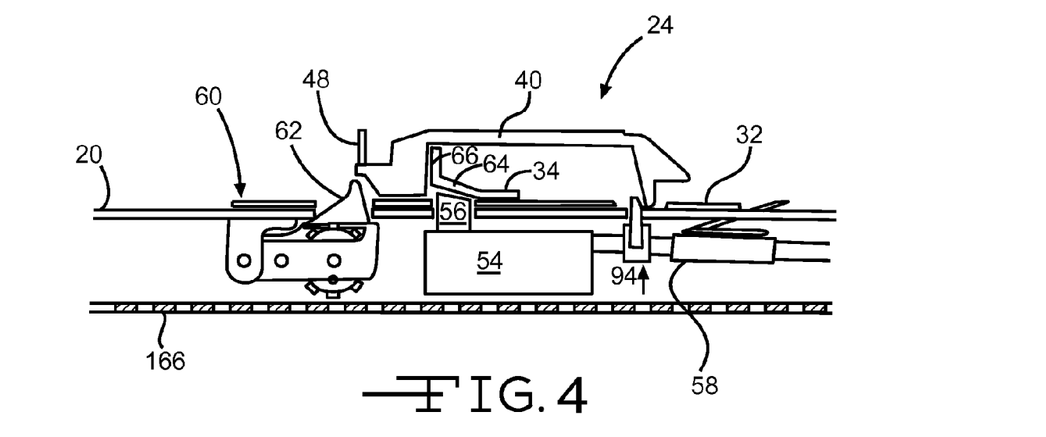

Referring now to FIG. 4, a cross sectional view of the catch and memory assembly 24 is shown. FIG. 4 illustrates the catch and memory assembly 24 when the backrest 14 is in its raised position. The activation bracket 34 is shown in a disengaged position. In addition to the components previously described, the catch and memory assembly 24 includes a track lock assembly, shown schematically at 54. The track lock assembly 54 will not be described in detail, but may include any desired assembly that can releasably prevent relative movement between the first rail 18 and the second rail 20. When the track lock assembly 54 is engaged, it prevents movement of the second rail 20 relative to the first rail 18. The track lock assembly 54 includes a lock activation pin 56. The lock activation pin 56 may be actuated to disengage the track lock assembly 54. The track lock assembly 54 also includes a lock activation member 58 operatively connected to the comfort adjustment bar 28. The lock activation member 58 may be actuated to disengage the track lock assembly 54, thereby permitting fore and aft movement of the bucket seat 10. The lock activation pin 56 and the lock activation member 58 are shown in their respective non-actuated positions in FIG. 4. Therefore, the track lock assembly 54 is engaged in FIG. 4.

The catch and memory assembly 24 also includes a memory module, indicated generally at 60. The memory module 60 includes a memory activation pin 62. The memory activation pin 62 may be actuated to engage the memory module 60. The operation of the memory module 60 will be described in detail below.

Figure 5:
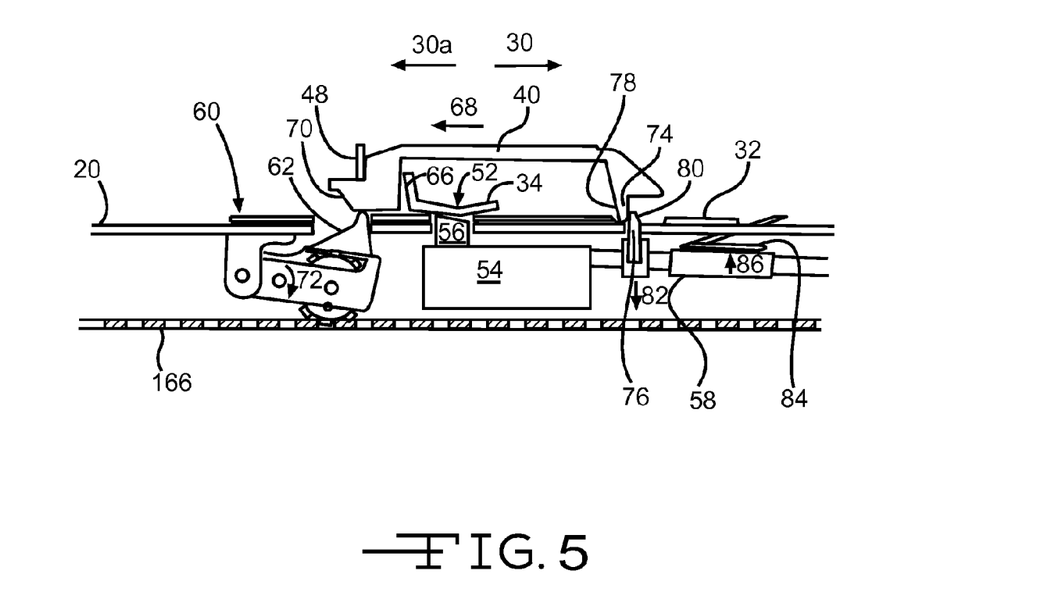

Referring now to FIG. 5, a cross sectional view similar to that shown in FIG. 4 is illustrated. In the view shown in FIG. 5, the activation bracket 34 has been rotated in the activation direction 52. The activation bracket 34 is shown in an engagement position. The activation bracket 34 includes a lock activation surface 64. The lock activation surface 64 is adapted to engage the lock activation pin 56 when the activation bracket is in the engagement position. Thus, the lock activation surface 64 of the activation bracket 34 actuates the lock activation pin 56 causing the track lock assembly 54 to disengage.

The activation bracket 34 also includes a sled engagement surface 66. The sled engagement surface 66 is adapted to engage the memory sled 40 when the activation bracket 34 is in the engagement position. The sled engagement surface 66 applies a force to the memory sled 40 sufficient to overcome the biasing force of the sled spring 42 (shown in FIG. 3). Thus, the sled engagement surface 66 moves the memory sled 40 to a sled activated position, as indicated by the arrow 68.

The memory sled 40 includes a memory engagement surface 70. The memory engagement surface is adapted to engage the memory activation pin 62 when the memory sled 40 is in the sled activation position. This causes the memory module 60 to move to a memory activation position, as indicated by the arrow 72. The operation of the memory module 60 will be described in detail below.

The memory sled 40 also includes a sled catch 74. The sled catch 74 is adapted to interoperate with a sled lock 76. The sled catch 74 includes a first catch surface 78. When the memory sled 40 is moved from a sled deactivated position (as shown in FIG. 4) to the sled activated position (as shown in FIG. 5), the first catch surface 78 engages with a first sled lock surface 80. The first catch surface 78 and the first sled lock surface 80 are adapted so that this engagement of the surface provides a force in the unlocking direction indicated by the arrow 82. The sled lock 76 is connected to the lock activation member 58. The lock activation member 58 includes a lock activation spring 84. The lock activation spring 84 provides a biasing force in the engagement direction indicated by the arrow 86. The force applied on the sled lock 76 by the first catch surface 78 is sufficient to overcome the biasing force of the lock activation spring 84. Therefore, the sled lock 76 is moved in the unlocking direction 82. This allows the memory sled to continue to move to the sled activated position, in the direction of the arrow 68. When the memory sled 40 has moved to the sled activated position, the lock activation spring 84 will bias the sled lock 76 into a lock position, as shown in FIG. 5.

Figure 6:
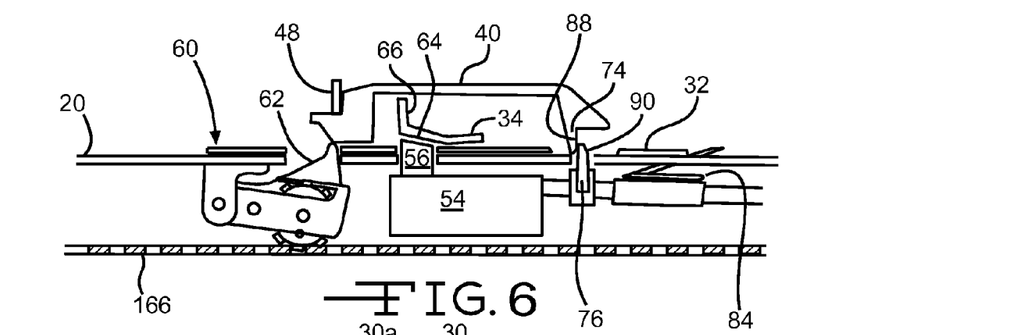

Referring now to FIG. 6, a cross sectional view similar to that shown in FIG. 5 is illustrated. In the view shown in FIG. 6, the activation bracket 34 has been rotated away from the activation direction 52 back to a rest or disengagement position. The lock activation surface 64 of the activation bracket 34 does not engage the lock activation pin 56 when the activation bracket 34 is in the disengagement position. Thus, the lock activation pin 56 is not actuated. This causes the track lock assembly 54 to engage and prevent relative movement between the first rail 18 and the second rail 20. The sled engagement surface 66 does not engage the memory sled 40 when the activation bracket 34 is in the disengagement position. The memory sled 40 is biased in the direction 44 by the sled spring 42 (shown in FIG. 3). However, the memory sled 40 is prevented from moving in the direction 44 by the sled lock 76. The sled catch 74 has a second catch surface 88. The sled lock has a second sled lock surface 90. When the memory sled 40 is biased from the sled activated position (as shown in FIG. 5) to the sled deactivated position (as shown in FIG. 4), the second catch surface 88 engages with the second sled lock surface 90. The second catch surface 88 and the second sled lock surface 90 are adapted so that this engagement does not provide a force in the unlocking direction sufficient to overcome the biasing force of the lock activation spring 84. Therefore, the sled lock 76 prevents movement of the memory sled 40 to the sled deactivated position.

Because the memory sled 40 remains in the sled activated position, the memory activation pin 62 remains actuated by the memory sled 40. Therefore, the memory module remains in the memory activation position. Operation of the memory module 60 will be described in detail below.

Figure 7:
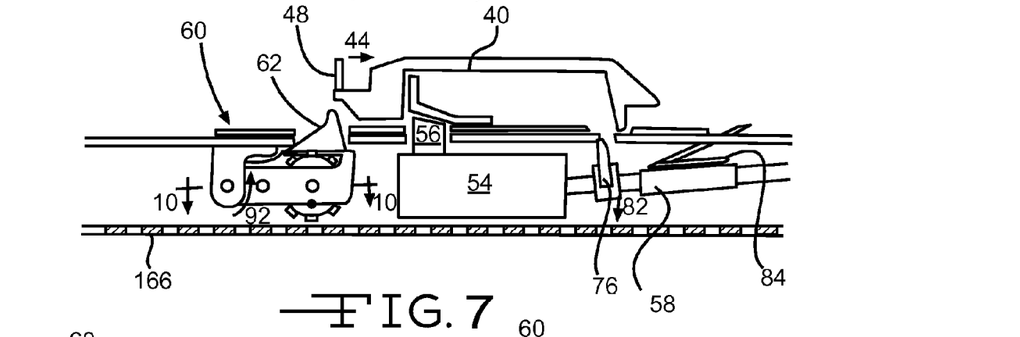

Referring now to FIG. 7, a cross sectional view similar to that shown in FIG. 6 is illustrated. In the view shown in FIG. 7, the comfort adjustment bar 28 has been actuated in order to allow adjustment of the position of the bucket seat 10. When the comfort adjustment bar 28 is actuated, the lock activation member 58 is moved against the biasing force of the lock activation spring 84. This causes the sled lock 76 to move in the unlocking direction 82. This also disengages the track lock assembly 54. When the sled lock 76 is moved in the unlocking direction 82, it does not prevent movement of the memory sled 40 to the sled deactivated position. The memory sled 40 remains biased in the direction 44 by the sled spring 42 (shown in FIG. 4). Therefore, the memory sled 40 is moved in the direction 44 to the sled deactivated position, as shown in FIG. 7.

When the memory sled 40 moves to the sled deactivated position, it no longer engages the memory activation pin 62. This causes the memory module 60 to move to a memory deactivation position, as indicated by the arrow 92. The operation of the memory module 60 will be described in detail below.

Referring back to FIG. 4, when the comfort adjustment bar 28 is no longer actuated, the lock activation spring 84 will bias the lock activation member 58 in the engagement direction 86. This will cause the track lock assembly 54 to engage. This will also cause to the sled lock 76 to move in a locking direction, indicated by the arrow 94. It should be appreciated that at this point the catch and memory assembly 24 is in the state depicted in FIG. 4.

Figures 8, 9:
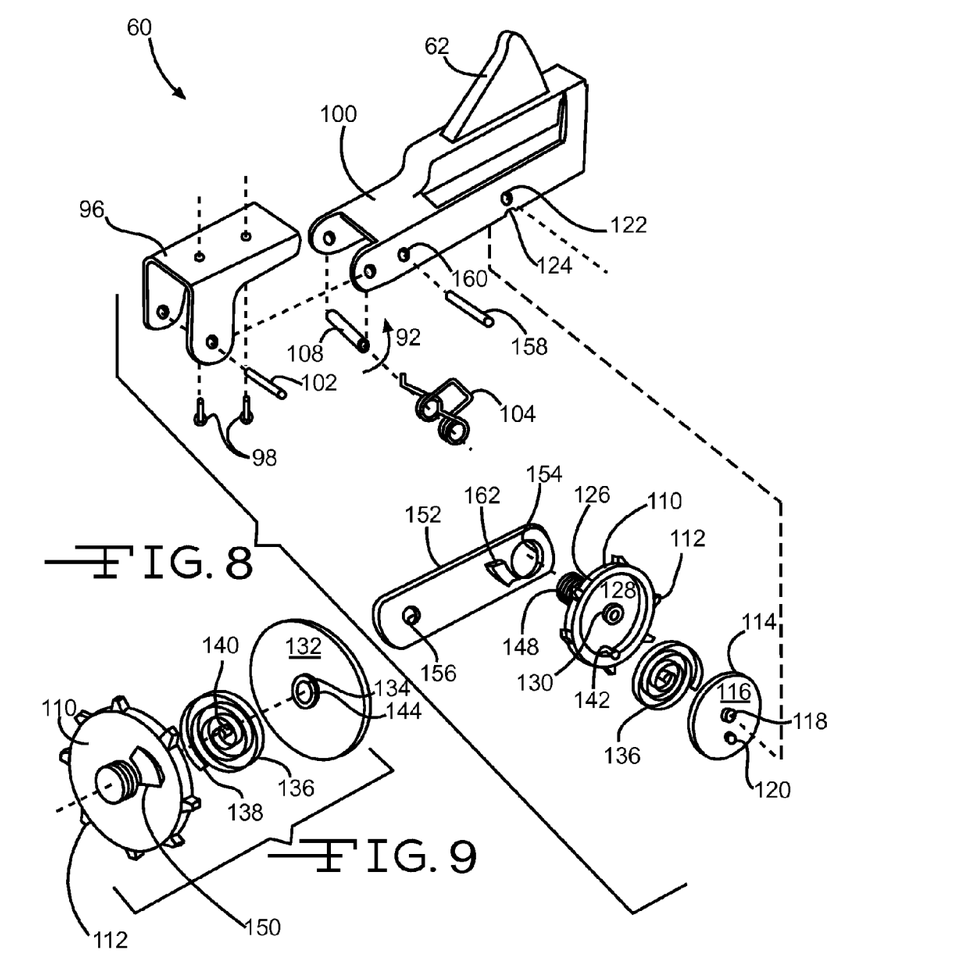
FIG. 8 is an exploded, perspective view of a portion of the memory module of FIG. 7.
FIG. 9 is an exploded, perspective view of a portion of the memory module of FIG. 8, with the view taken from the opposite direction to illustrate details on the opposite sides of some components.

Referring now to FIG. 8, there is shown an exploded, perspective view of the memory module 60. The memory module 60 includes a memory mounting bracket 96. The memory mounting bracket 96 is attached to the second rail 20 by rivets 98. The memory mounting bracket 96 may be attached to the second rail 20 by other desired fasteners, such as by pins, adhesives, threaded fasteners, or by welding. The memory module 60 also includes a memory arm 100. The memory arm 100 is attached for pivoting movement relative to the memory mounting bracket 96 by a pivot shaft 102. The memory module 60 includes a memory spring 104. The memory spring 104 biases the memory arm 100 in the memory deactivation direction, indicated by the arrow 92. The illustrated memory spring 104 is a coil spring disposed around a sleeve 108 and around the pivot shaft 102. It should be appreciated that the memory spring 104 may be any desired biasing member, such as a resilient member or a counter weight.

The aforementioned memory activation pin 62 is attached to the memory arm 100. It should be appreciated that when the memory sled 40 is moved to the sled activation position (as shown in FIG. 5) the memory arm 100 is moved to the memory activation position (as indicated by the arrow 72 in FIG. 5) over the biasing force of the memory spring 104. Further, when the memory sled 40 is moved to the sled deactivation position (as shown in FIG. 7) the biasing force of the memory spring 104 moves the memory arm 100 to the memory deactivation position, as indicated by the arrow 92.

In further reference to FIG. 8, the memory module 60 includes a memory wheel 110. The memory wheel 110 is mounted for pivotal movement relative to the memory arm 100. The memory wheel includes a plurality of teeth 112. The illustrated memory wheel 110 is a metal wheel with a plastic over mold. This reduces the noise made by the memory wheel 110. It should be appreciated that the memory wheel 110 may be made of other desired materials.

The memory module 60 also includes a face place 114. A first side 116 of the face plate 114 includes an axle 118 and a stub 120. The axle 118 is adapted to be held in an axial opening 122 defined on the memory arm 100. The stub 120 is adapted to held in a stub opening 124 defined on the memory arm 100. Therefore, the face plate 114 is fixed relative to the memory arm 100.

A first side 126 of the memory wheel 110 includes a spring space 128. A wheel hub 130 is located at the axis of the memory wheel 110 within the spring space 128. As shown in reference to FIG. 9, a second side 132 of the face plate 114 includes a face plate hub 134. The face plate hub 134 is adapted to cooperate with the wheel hub 130 to allow the memory wheel 110 to rotate relative to the face plate 114 when the memory module 60 is assembled. The face plate 114 fits onto the memory wheel 110 such that the face plate 114 covers the spring space 128.

The memory wheel 110 also includes a clock spring 136. The clock spring 136 is located within the spring space 128. The clock spring 136 includes a first end 138 and a second end 140. The first end 138 of the clock spring 136 is fixed relative to the memory wheel 110 at a wheel attachment point 142. The second end 140 of the clock spring 136 is fixed relative to the face plate 114 at a face plate attachment point 144. The operation of the clock spring 136 will be described in detail below.

Figure 10:
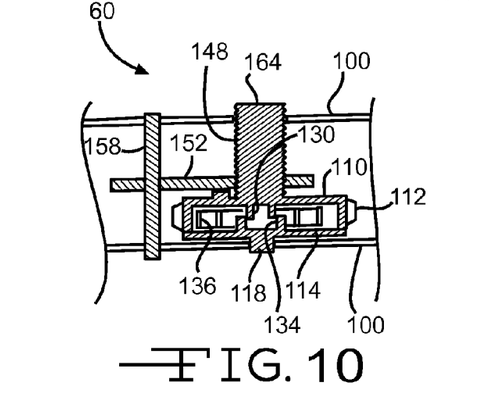
FIG. 10 is a cross sectional view of the assembled memory module of FIG. 9, taken along the line 10-10 of FIG. 7. The memory module is shown in a zero position.

As shown in FIG. 10, a second side 146 of the memory wheel 110 includes threaded axle 148. The threaded axle 148 is coaxial with the center of the memory wheel 110. The second side 146 of the memory wheel 110 also includes a wheel end stop 150. The wheel end stop 150 is a raised face generally perpendicular to the second side 146 of the memory wheel 110. The wheel end stop 150 is generally parallel with the axis of the memory wheel 110. It should be appreciated that the wheel end stop 150 may have a different configuration or orientation from that illustrated. Also, the memory wheel 110 may include more than one wheel end stop 150. For example, there may be two wheel end stops located generally at opposite sides of the second side 146 of the memory wheel 110. The function of the memory wheel end stop 150 will be described below.

Referring back to FIG. 8, the memory module 60 also includes a memory nut 152. The memory nut 152 is a piece of stamped steel, but may be made of other desired material and methods. The memory nut 152 includes a threaded opening 154. The threaded opening is adapted to fit onto the threaded axle 148 of the memory wheel 110. The memory nut 152 also includes a stop opening 156. The stop opening 156 is adapted to fit onto a stop shaft 158. The memory nut 152 is able to slide freely along the stop shaft 158. The stop shaft 158 is adapted to be fixed relative to the memory arm 100 at a stop mount 160.

The memory nut 152 also includes a nut end stop 162. The nut end stop 162 is a raised face generally perpendicular to memory nut 152. The nut end stop 162 is generally parallel with the axis of the threaded opening 154. It should be appreciated that the nut end stop 162 may have a different configuration or orientation from that illustrated. Also, the memory nut 152 may include more than one nut end stop 162. There may be one nut end stop 162 to complement each wheel end stop 150, although this is not required. The function of the nut end stop 162 will be described below.

When the memory module 60 is assembled, the face plate 114 is secured relative to the memory arm 100 by the axle 118 and the stub 120. The memory wheel 110 is connected for rotational movement relative to the face plate 114 by the cooperation of the wheel hub 130 and the face plate hub 134. An outer end 164 of the threaded axle 148 is supported by rotational movement by the memory arm 100. The memory nut 152 is supported by the threaded axle 148 and the stop shaft 158. Because the memory nut 152 is supported by the stop shaft 158, it is unable to rotate with the memory wheel 110. Therefore, as the memory wheel 110 rotates the memory nut 152 slides along the stop shaft 158, moving farther from or closer to the memory wheel 110 depending on which direction the memory wheel 110 is turning. The memory nut 152 is able to approach the memory wheel 110 until the nut end stop 162 engages the wheel end stop 150. The engagement of these two faces prevents the memory nut 152 from moving any closer to the memory wheel 110. It should be appreciated that this also prevents further rotation of the memory wheel 110 in the direction that would cause the memory nut 152 to approach the memory wheel 110. Therefore, the memory nut 152 acts as a blocking mechanism to prevent rotation of the memory wheel 110 in a particular direction beyond a particular point. When the nut end stop 162 engages the wheel end stop 150, the memory module 60 is said to be in the zero position. The clock spring 136 is pre tensioned when the memory module is in the zero position, although this is not necessary.

Figure 11:
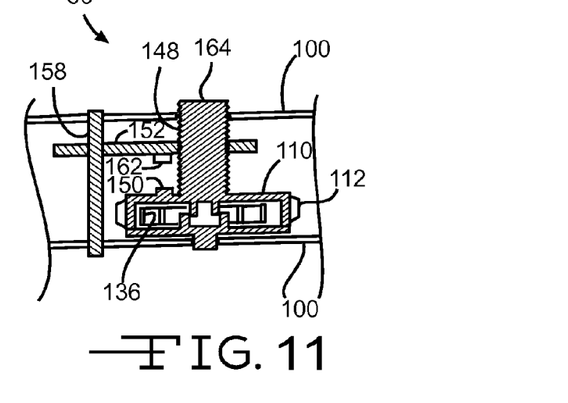
FIG. 11 is a cross sectional view similar to that shown in FIG. 10. The memory module is shown removed from the zero position.

Referring to FIG. 10, there is shown a cross sectional view of the memory module 60. The cross section in FIG. 10 is taken along the line 10-10 in FIG. 7. As illustrated in FIG. 10, the memory module 60 is in the zero position. When the memory module 60 is activated, as shown in FIG. 5, the memory wheel 110 is moved so that the teeth 112 engage with openings in a track 166. The location at which the teeth 112 engage the track 166 is the memory point. The track 166 is mounted relative to the first rail 18. When the second rail 20 is moved in the direction indicated by the arrow 30, the engagement of the teeth 112 with the track 166 causes the memory wheel 110 to rotate. The rotation of the memory wheel 110 causes rotation of the threaded axle 148. The memory nut 152 is unable to rotate, and so it moves along the threaded axle 148 and the stop shaft 158. The farther the second rail 20 is moved in the direction 30, the farther the memory nut 152 will move from the memory wheel 110. FIG. 11 illustrates a cross sectional view similar to that of FIG. 10, but with the memory nut displaced a distance from the memory wheel. It should be appreciated that the memory wheel 110 is also rotating relative to the face plate 114. As a result, the clock spring 136 is wound more tightly as the memory nut 152 is moved further from the memory wheel 110.

When the second rail 20 is moved in the direction indicated by the arrow 30, the engagement of the teeth 112 with the track 166 causes the memory wheel 110 to rotate. The memory nut 152 will move along the threaded axle 148 back toward the memory wheel 110. When the memory module reaches 60 the memory point, the wheel end stop 150 will engage the nut end stop 162. The engagement of the two end stop will prevent further rotation of the memory wheel 110. Since the memory wheel 110 is prevented from rotating, the engagement of the teeth 112 with the track 166 will prevent further movement of the second rail 12 in the direction 30*a*. Therefore, an operator of the seat will be able to identify the memory point, since it is the point at which the bucket seat 10 can no longer be moved in the direction 30*a*. It should be appreciated that the direction 30*a* will generally be the aft direction in a passenger vehicle. It should also be appreciated that the memory wheel 110 is also rotating relative to the face plate 114. As a result, the clock spring 136 is wound less tightly as the memory nut 152 is moved closer to the memory wheel 110.

It should be appreciated that the back rest 14 of the bucket seat 10 may be moved from the dumped position to the raised position while the bucket seat 10 is not at the memory point. It that situation, the memory module 60 is not in the zero position and the wheel end stop 50 is not engaged with the nut end stop 162. It should further be appreciated that the catch and memory assembly 24 will be in the condition illustrated in FIG. 6. When the comfort adjustment bar 28 is moved to adjust the bucket seat 10, the memory module 60 will move to the memory deactivation position, as previously described in reference to FIG. 7. When the memory module 60 moves to the memory deactivation position, the teeth 112 of the memory wheel 110 no longer engage the track 166. The clock spring 136 provides a biasing force between the memory wheel 110 and the face plate 114. When the teeth 112 are no longer engaged with the track 116, the force provided by the clock spring 136 will cause the memory wheel 110 to rotate relative to the face plate 114. The rotation of the memory wheel 110 will cause the memory nut 152 to move closer to the memory wheel 110 until the wheel end stop 150 engages the nut end stop 162. When the wheel end stop 150 engages the nut end stop 162, the force provided by the clock spring 136 will not be able to rotate the memory wheel 110 any further. At this point the memory module 60 is in the zero position.

Operation of the bucket seat 10 will now be described in order to clarify the operation of the seat track assembly 16 and the catch and memory assembly 24. An occupant of the bucket seat 10 may use the comfort adjustment bar 28 to release the track lock assembly 54 (as shown in FIG. 7). This allows the occupant to move the bucket seat 10 fore and aft to a user-selected position. Use of the comfort adjustment bar 28 also releases the memory sled 40, and sets the memory module 60 to the zero position. When the bucket seat 10 is at the user-selected position, the comfort adjustment bar 28 is released and the track lock assembly 54 engages.

Referring back to FIG. 1, the illustrated bucket seat 10 includes a number of handles 168. The handles 168 are included for illustrative purposes only, and are representative of various non-limiting options for actuating the mechanism (not shown) used to move the backrest to the dumped position. When a user wishes to gain access to the space behind the bucket seat 10, one of the handles 168 may be used to actuate the easy entry. The handle 168 releases the backrest 14, allowing it to move from its use position to a more forward, easy entry position. It should be appreciated that the backrest 14 may be biased toward the easy entry position, or may require the user to move it manually to the easy entry position. The movement of the backrest 14 to the easy entry position causes the Bowden cable 46 (shown in FIG. 3) to apply a force to the activation bracket 34. This force causes the activation bracket 34 to rotate in the direction 52.

Referring now to FIG. 5, the activation bracket 34 is shown in this rotated state. Rotation of the activation bracket 34 depresses the lock activation pin 56, which disengages the track lock assembly 54. This allows the bucket seat 10 to be moved fore and aft. It should be appreciated that the bucket seat 10 may be biased in a forward direction, in order to facilitate access to the space behind the bucket seat 10. Rotation of the activation bracket 34 also moves the memory sled 40 in the direction 68, as shown in FIG. 5. The memory sled 40 activates the memory module 60 by causing the memory wheel 110 to engage the track 166. The activation of the memory module 60 records the user-selected position of the bucket seat 10. The bucket seat 10 may now be moved in the forward direction, indicated by arrow 30.

When it is desired to return the bucket seat 10 to its original posture, the backrest 14 is raised to its use position. When the backrest 14 is raised to its use position, the Bowden cable 46 no longer applies a force on the activation bracket 34. Because the activation bracket 34 is biased by the tube spring 36, it will rotate back to the position shown in FIG. 6. The activation bracket 34 is no longer depressing the lock activation pin 56, and the track lock assembly 54 engages, preventing movement of the bucket seat 10.

Refer now back to FIG. 10 regarding the specific operation of the memory module 60. When the bucket seat 10 is at the user selected position and the easy entry is actuated, the memory module 60 is in the zero position, shown in FIG. 10. When the bucket seat 10 is moved forward of the user-selected position, the memory wheel 110 rotates, and the memory nut 152 is moved away from the memory wheel 110, as illustrated in FIG. 11.

After easy entry is complete and the user wants to return the bucket seat 10 back to the user-selected position, the bucket seat 10 may be manually moved in the aft direction, as indicated by the arrow 30a. When the bucket seat 10 is moved in the aft direction, the memory nut 152 is moved back toward the memory wheel 110, until the memory module 60 is at the zero position, illustrated in FIG. 10. At this point, the nut end stop 162 has engaged the wheel end stop 150 and the memory nut 152 cannot move any further toward the memory wheel 110. This acts as the blocking mechanism to prevent further rotation of the memory wheel 110. A rearward force applied to move the bucket seat 10 in the aft direction will be resisted by the memory module 60. Because the teeth 112 of the memory wheel 110 are engaged with the track 166, the rearward force will be supported by the teeth of the memory wheel. It should be appreciated that the memory module 60 only prevents rearward movement past the user-selected position, and the bucket seat 10 may be moved forward of the user-selected position, and rearward up to the user-selected position, without that movement being prevented by the memory module 60.

It should be appreciated that while the memory module 60 and the catch and memory assembly 24 have been described for use with a particular seat track assembly, the memory module 60 or the catch and memory assembly 24 may be used with any desired seat track assembly.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An adjustable memory track assembly comprising:
a track assembly having a lower rail and an upper rail that is supported on the lower rail for relative movement;
a track lock assembly that is operable either a locked state, wherein relative movement of the lower and upper rails is resisted, and an unlocked state, wherein relative movement of the lower and upper rails is permitted to allow the upper rail to be moved to and locked in a user-selected position; and
a memory module operable that is operable by means of an actuator to record the user-selected position, wherein the memory module includes a memory wheel that is mounted relative to a first one of the lower and upper rails and includes a plurality of teeth adapted to engage openings in a track mounted relative to a second one of the lower and upper rails when the memory module is operated;
wherein the actuator is operatively connected to disengage the track lock assembly to allow movement in a first direction of the seat from the user-selected location to a location and thereafter allow movement of the seat in a second direction back to, but not past, the user-selected location,
the memory module further including a blocking mechanism that prevents rotation of the memory wheel and, therefore, movement of the seat in the second direction past the user-selected position independently of whether the track lock assembly is in the locked or unlocked state.

2. The adjustable memory track assembly defined in claim 1 wherein the plurality of teeth of the memory wheel are adapted to support a load to prevent rearward movement of the seat past the user-selected position.

3. The adjustable memory track assembly defined in claim 2 wherein the memory module is located within an interior space of one of the lower and upper rails.

4. The adjustable memory track assembly defined in claim 3 wherein the actuator is activated when a backrest portion of the seat is moved from a use position to an easy entry position.

5. The adjustable memory track assembly defined in claim 4 wherein the actuator is deactivated when the backrest portion of the seat is moved from the easy entry position to the use position.

6. The adjustable memory track assembly defined in claim 5 wherein the memory module includes a threaded axle attached to the memory wheel and the memory module includes a memory nut that includes a threaded opening, wherein the threaded opening is adapted to engage the threaded axle, and wherein the memory nut moves axially along the threaded axle when the seat is moved away from the user-selected location.

7. The adjustable memory track assembly defined in claim 6 wherein the blocking element includes a first memory surface mounted relative to the memory nut and a second memory surface mounted relative to the memory wheel, and wherein the first memory surface engages the second memory surface when the seat is at the user-selected position.

8. The adjustable memory track assembly defined in claim 7 further including a memory lock that is mounted relative to the memory module and is operable via the actuator to activate the memory module.

* * * * *